(12) United States Patent
Higashi

(10) Patent No.: US 6,678,022 B2
(45) Date of Patent: Jan. 13, 2004

(54) BACKLIGHT UNIT WITH HEAT-RADIATING PLATES SOLDERED TO TERMINALS AND LIQUID CRYSTAL DISPLAY DEVICE USING THE BACKLIGHT UNIT

(75) Inventor: Shinji Higashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/231,481

(22) Filed: Aug. 30, 2002

(65) Prior Publication Data

US 2003/0053007 A1 Mar. 20, 2003

Related U.S. Application Data

(63) Continuation of application No. PCT/JP00/01270, filed on Mar. 3, 2000.

(51) Int. Cl.[7] .............................................. G02F 1/1335
(52) U.S. Cl. ......................... 349/65; 362/218; 362/294
(58) Field of Search ............................... 349/61, 62, 63; 313/484, 42, 43, 46; 362/294, 218

(56) References Cited

U.S. PATENT DOCUMENTS 3,974,418 A * 8/1976 Fridrich ........................ 315/59
6,147,724 A * 11/2000 Yoshii et al. .................. 349/62

FOREIGN PATENT DOCUMENTS

| JP | 09-102684 A | 4/1997 |
| JP | 10-106329 A | 4/1998 |
| JP | 11-024072 A | 1/1999 |

* cited by examiner

Primary Examiner—Robert H. Kim
Assistant Examiner—Timothy L Rude
(74) Attorney, Agent, or Firm—Armstrong, Kratz, Quintos, Hanson & Brooks, LLP

(57) ABSTRACT

A backlight unit includes a light guide plate, a fluorescent tube having terminals at both ends thereof and disposed along a side surface of the light guide plate, a reflector plate fitted to a principal surface on one side of the light guide plate, and a reflector film fitted to the light guide plate so as to cover the fluorescent tube. Leads are soldered respectively to the terminals of the fluorescent tube, and heat-radiating plates are co-soldered to the solder portions. A temperature rise at the solder portion can be restrained by the heat-radiating plate, so that deterioration of the solder portions can be restrained, and contact failure between the terminals of the fluorescent tube and the leads due to deterioration of the solder portions can be prevented.

6 Claims, 5 Drawing Sheets

BACKLIGHT UNIT WITH HEAT-RADIATING PLATES SOLDERED TO TERMINALS AND LIQUID CRYSTAL DISPLAY DEVICE USING THE BACKLIGHT UNIT

This is a continuation of International PCT Application No. PCT/JP00/01270 filed Mar. 3, 2000 which was not published in English.

BACKGROUND OF THE INVENTION

1. Field of the Invention

The present invention relates to a backlight unit using as a backlight for a liquid crystal panel or the like, and particularly to a backlight unit of the so-called side light or edge light system in which light from a light-emitting body is introduced through a side surface of a light guide plate.

2. Description of the Related Art

Hitherto, a liquid crystal display device has been known in which a backlight unit in the same shape as a transmission type liquid crystal panel is disposed on the back side of and in parallel to the liquid crystal panel, and light is radiated from the rear side of the liquid crystal panel by the backlight unit. The liquid crystal panel is constituted, for example, by sealing a liquid crystal between transparent electrode substrates mutually laminated with a seal, a spacer or the like therebetween, and polarizer plates are adhered respectively to the transparent electrode substrates.

The backlight unit includes a light diffuser plate, a light guide plate, and a reflector plate in this order from the side of the liquid crystal panel, and a fluorescent tube as a backlight light source is disposed along a side surface of the light guide plate. Further, a reflector film is fitted to the light guide plate so as to cover the fluorescent tube, whereby the light from the fluorescent tube is efficiently introduced into the light guide plate through the side surface of the light guide plate by the reflector film.

In the liquid crystal display device having such a structure, first, the light emitted directly from the fluorescent tube and the light reflected by the reflector film are incident on the light guide plate through the side surface of the light guide plate. The light incident on the light guide plate repeatedly undergoes multiple reflection inside the light guide plate and on the reflector plate provided on the back surface of the light guide plate, and thereafter comes out through the front surface of the light guide plate. The light coming out of the light guide plate is diffused by the light diffuser plate, and is incident on the liquid crystal panel.

In such a backlight unit, when it is intended to obtain a higher luminance, the amount of heat generated at electrode portions of the fluorescent tube is enlarged, resulting in a temperature in excess of 80 to 100° C. As a result, there are the problems that bad effects are exerted on the reflector film, the light guide plate or a casing of the backlight unit and the like, and nonuniformity of picture is generated in the liquid crystal panel due to the thermal effects.

In order to solve the problems, Japanese Patent Laid-open No. Hei 10-106329 discloses a backlight unit in which heat-radiating sheets formed of copper foil are adhered to electrode portions of the fluorescent tube for the purpose of cooling (heat radiation) at the electrode portions of the fluorescent tube. In this backlight unit, since the heat-radiating sheets are adhered to the electrode portions of the fluorescent tube, a certain extent of heat radiation effect can be expected. However, soldered portions between the terminals of the fluorescent tube and leads are not in direct contact with the heat-radiating sheets, respectively, so that there is a problem that the heat radiation effect at the soldered portions is insufficient, and the solder is deteriorated due to a rise in temperature. When the temperature at the soldered portions is raised to about 100° C., a tensile stress is exerted on the soldered portions due to thermal expansion, so that the soldered portions are deteriorated, leading to contact failure between the terminal and the lead.

Another heat radiation structure for a liquid crystal display device including a backlight light source is disclosed in Japanese Patent Laid-open No. Hei 11-24072. The liquid crystal display device described in the publication has a structure in which a heat-radiating plate is so disposed that a clearance is formed on the back side of a light guide plate, and the clearance is so set as to be smaller as the distance from a fluorescent tube disposed along a side surface of the light guide plate increases, whereby nonuniformity in temperature of a liquid crystal panel is suppressed, and nonuniformity in display is prevented. However, even in the liquid crystal display device described in the publication, nothing is mentioned as to the deterioration of soldered portions between terminals of the fluorescent tube and leads arising from heat generation. Therefore, there is the fear that the soldered portions between the terminals of the fluorescent tube and the leads may be deteriorated due to heat generation, and contact failure between the terminal of the fluorescent tube and the lead may occur.

SUMMARY OF THE INVENTION

Accordingly, it is an object of the present invention to provide a backlight unit in which deterioration of soldered portions between terminals of a fluorescent tube and leads due to heat generation is prevented from occurring and contact failure between the terminal and the lead is prevented from occurring.

In accordance with an aspect of the present invention, there is provided a backlight unit including a light guide plate, a fluorescent tube having terminals at both ends thereof and disposed along a side surface of the light guide plate, a reflector plate mounted to a one surface of the light guide plate, a reflector film mounted to the light guide plate so as to cover the fluorescent tube, a pair of leads soldered respectively to the terminals, and a heat-radiating plate provided at at least one of soldered portions between the terminals and the leads.

Preferably, the heat-radiating plate is co-soldered to the soldered portion between the terminal and the lead. By this, the heat generated at an electrode portion of the fluorescent tube is transferred to the terminal, the solder and the heat-radiating plate by heat conduction, and is radiated from the heat-radiating plate. As a result, a temperature rise at the soldered portion can, be restrained, and deterioration of the soldered portion can be prevented.

In accordance with another aspect of the present invention, there is provided a liquid crystal display device including a liquid crystal panel, a light guide plate mounted to a one surface of the liquid crystal panel, a fluorescent tube having terminals at both ends thereof and disposed along a side surface of the light guide plate, a reflector plate mounted to a principal surface of the light guide plate on the side opposite to the liquid crystal panel, a reflector film mounted to the light guide plate so as to cover the fluorescent tube, a pair of leads soldered respectively to the terminals, and a heat-radiating plate provided at at least one of soldered portions between the terminals and the leads.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
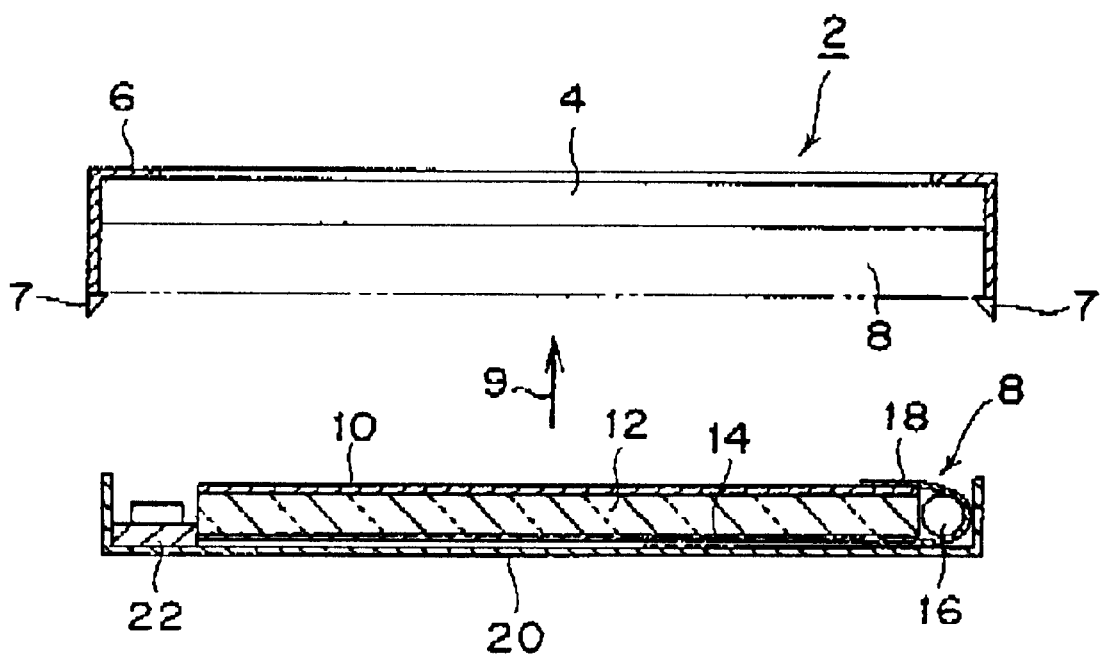
FIG. 1 is an exploded sectional view of a liquid crystal display device including a backlight unit according to one embodiment of the present invention.

Referring to FIG. 1, there is shown an exploded sectional view of a liquid crystal display device 2 including a backlight unit 8 according to one embodiment of the present invention. A liquid crystal panel 4 is contained in a metallic housing 6, the backlight unit 8 is contained in the housing 6 as indicated by an arrow 9, and is engaged and stopped by an engaging and stopping claw 7. Alternatively, projections formed on the housing 6 may be fixed to the backlight unit 8 by caulking after containing the backlight unit 8 in the housing 6.

Figure 5:
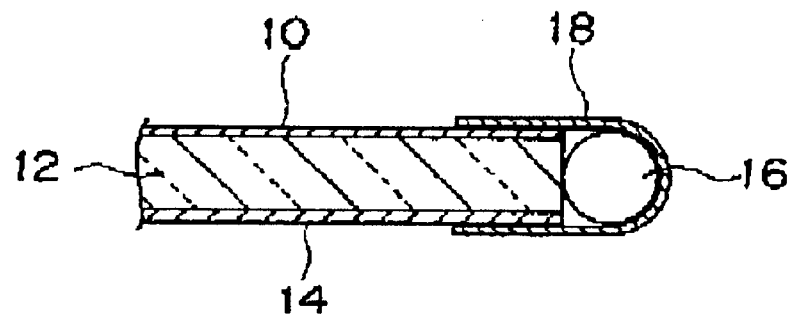
FIG. 5 is a sectional view showing the fitting of a reflector film.

The backlight unit 8 comprises a light diffuser plate 10, a light guide plate 12 and a reflector plate 14 in this order from the side of the liquid crystal panel 4, and a fluorescent tube 16 as a backlight light source is disposed on one side surface of the light guide plate 12. The light guide plate 12 is formed of a synthetic resin such as polymethyl methacrylate (PMMA) in a rectangular shape with a material thickness of about 3.0 mm, and the fluorescent tube 16 is disposed along one side surface thereof. As best shown in FIG. 5, the fluorescent tube 16 is fixed along the one side surface of the light guide plate 12 by a reflector film 18 adhered to the light diffuser plate 10 and the reflector plate 14 so as to cover the fluorescent tube 16.

Figure 3:
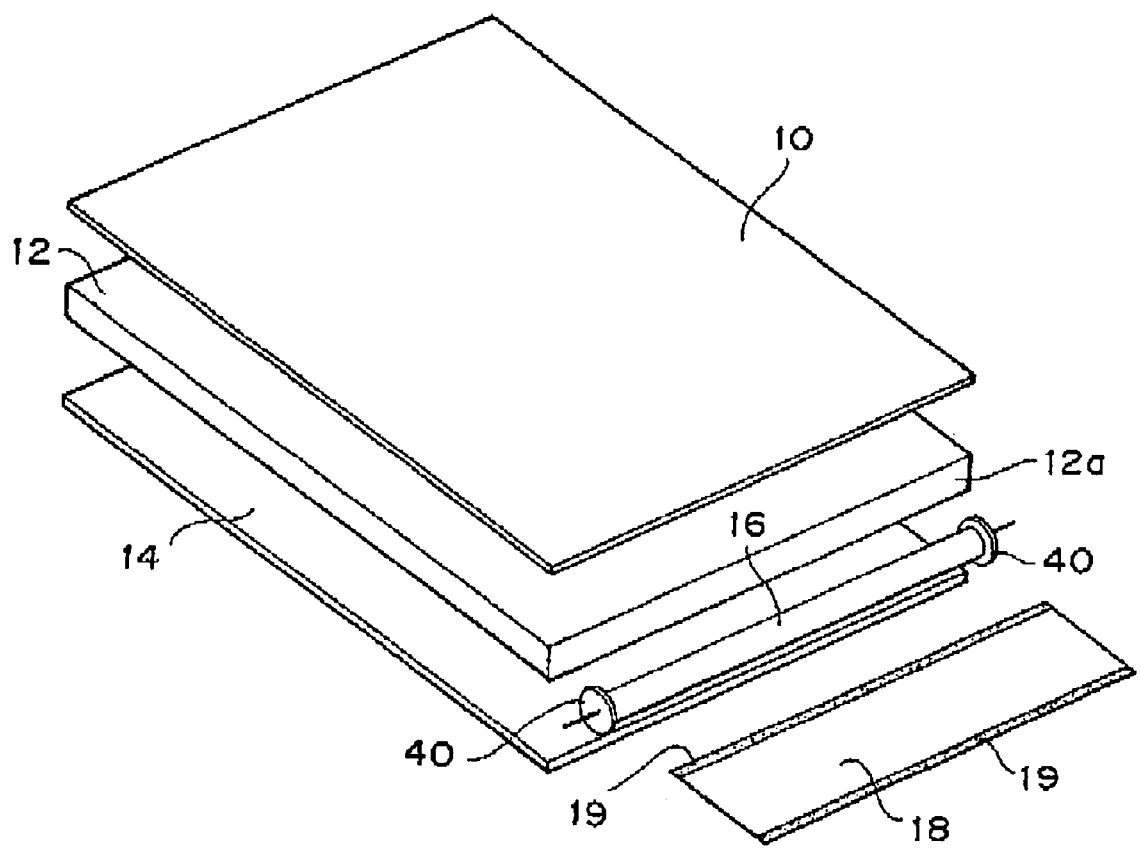
FIG. 3 is an exploded perspective view of a major part of the backlight unit according to the embodiment.
Figure 4:
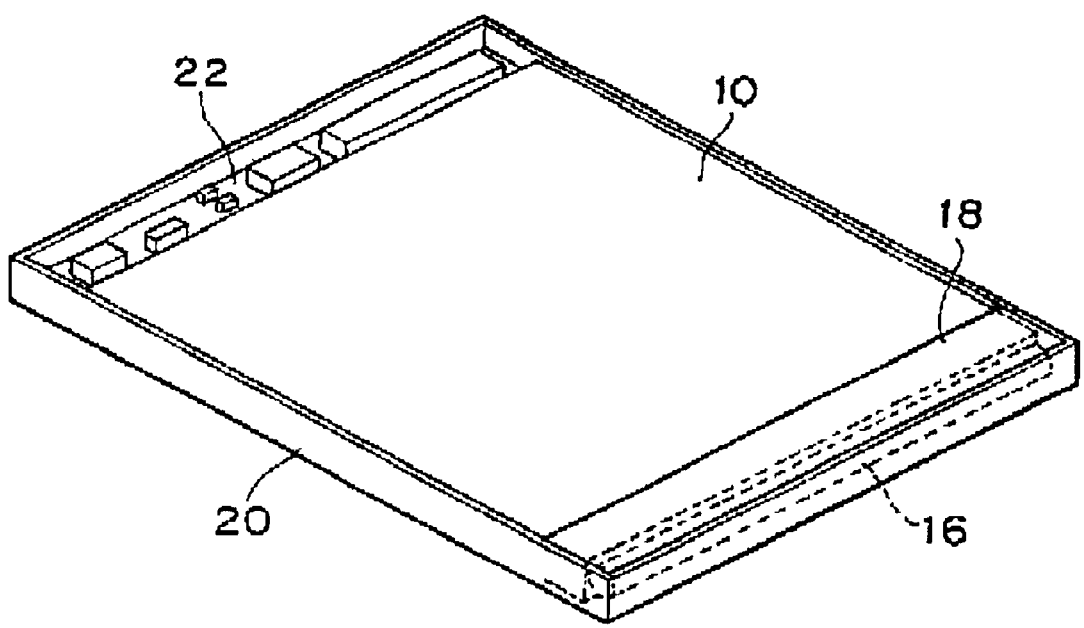
FIG. 4 is a perspective view of the backlight unit according to the embodiment.

The reflector film 18 is formed of, for example, polyethylene terephthalate (PET) in a rectangular shape with a material thickness of about 0.03 mm, and is provided with adhesive layers 19 on both sides, as shown in FIG. 3 The light diffuser plate 10, the light guide plate 12, the reflector plate 14 and the fluorescent tube 16 are contained in a case 20. In the case 20, further, a drive circuit substrate 22 for turning on the fluorescent tube 16 is fitted on the side opposite to the fluorescent tube 16. The light diffuser plate 10 is formed of a light-transmitting resin, diffuses the light emitted from the front surface of the light guide plate 12, thereby uniformizing the surface luminance, and then causes the light to be incident on the liquid crystal panel 4.

Figure 2:
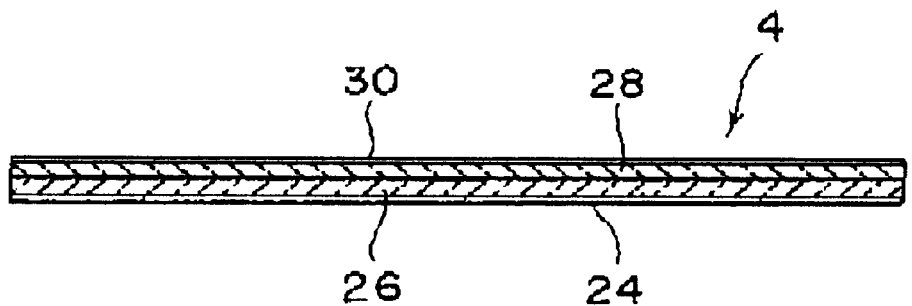
FIG. 2 is a sectional view of a liquid crystal panel.

Referring to FIG. 2, there is shown an schematic sectional view of the liquid crystal panel 4. The liquid crystal panel 4 has a structure in which an STN liquid crystal is sealed between transparent electrode substrates 26, 28 laminated on each other, for example, with a seal, a spacer and the like therebetween, a polarizing plate 24 for transmitting only a predetermined linearly polarized light component therethrough is adhered to the electrode substrate 26, and a polarizing plate 30 for transmitting therethrough the same linearly polarized light component as that of the polarizing plate 24 is adhered to the electrode substrate 28.

In the backlight unit 8 according to the present embodiment, first, the light from the fluorescent tube 16 disposed along one side surface of the light guide plate 12 enters into the light guide plate 12 through the side surface of the light guide plate 12 either directly or after being reflected by the reflector film 18, repeatedly undergoes multiple reflection in the light guide plate 12 by the reflector plate 14, and then comes out through the front surface of the light guide plate 12. The light is further diffused by the light diffuser plate 10, whereby the surface luminance is uniformized, and the light is incident on the liquid crystal panel 4.

Figure 6:
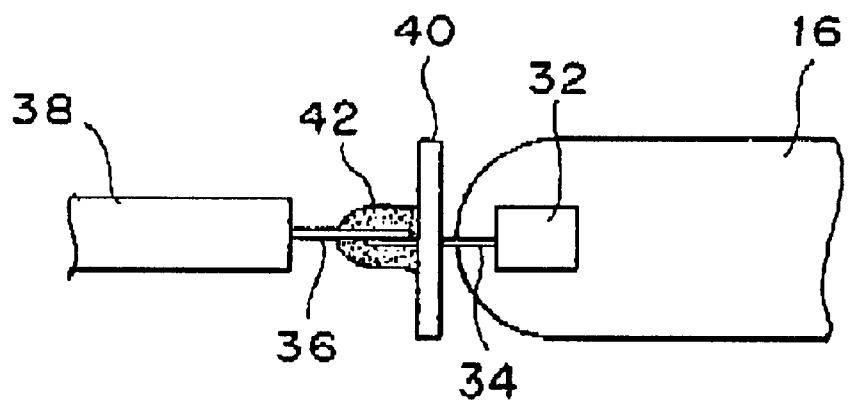
FIG. 6 is an schematic diagram showing a first embodiment of a heat-radiating structure for a soldered portion between a terminal and a lead.

In the backlight unit 8 constituted as above, when it is intended to obtain a higher luminance, the amount of heat generated at electrode portions of the fluorescent tube 16 is enlarged, resulting in a high temperature in excess of 80 to 100° C., whereby the soldered portions connecting between the terminals of the fluorescent tube and the leads may be deterorated. FIG. 6 shows an schematic view of a heat-radiating structure for the soldered portions according to a first embodiment of the present invention. The fluorescent tube 16 is about 1.8 to 2.0 mm it diameter, and has a power of typically 2 to 3 W. When the fluorescenrt tube 16 is being turned on, a voltage of about 600 V is impressed on an electrode 32. The terminal 34 of the fluorescent tube 16 and the lead 36 are solder-connected to each other with a solder 42. Numeral 38 denotes a covering of the lead 36.

In the present embodiment, in order to positively radiate heat from the soldered portion, a heat-radiating plate 40 formed of a material having good thermal conductivity such as aluminum is fixed adjacently to an end portion of the fluorescent tube 16 by the solder 42. The soldering of the heat-radiating plate 40 is conducted simultaneously with the step of soldering the terminal 34 and the lead 36 to each other, so that the fixation of the heat-radiating plate 40 can be easily performed without increasing the number of steps, as compared with the prior art. In addition, since the heat-radiating plate 40 is fixed directly to the terminal 34 by the solder 42, the heat generated at the electrode 32 is conducted through the terminal 34 and the solder 42 to the heat-radiating plate 40, so that the heat can be efficiently radiated by the heat-radiating plate 40. As a result, deterioration of the soldered portion can be restrained, and contact failure between the terminal 34 and the lead 36 due to deterioration of the soldered portion can be effectively prevented.

Figure 7A:
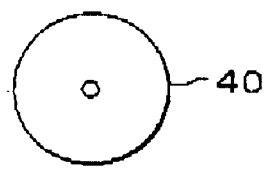
FIG. 7A is a front view of the heat-radiating plate.
Figure 7B:
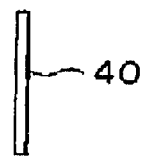
FIG. 7B is a side view of the heat-radiating plate shown in FIG. 7A.
Figure 8A:
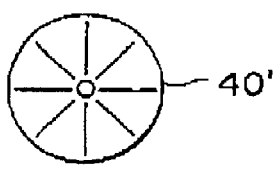
FIG. 8A is a front view of another heat-radiating plate.
Figure 8B:
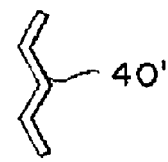
FIG. 8B is a side view of the heat-radiating plate shown in FIG. 8A.

FIG. 7A shows a front view of the heat-radiating plate 40, and FIG. 7B shows a side view thereof. In order to enhance heat radiation efficiency, a wavy heat-radiating plate 40' as shown in FIGS. 8A and 8B may be used.

Figure 9:
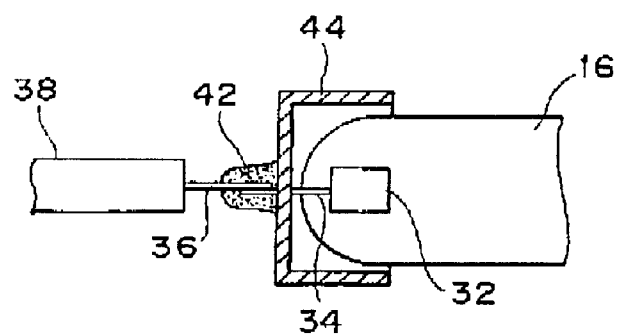
FIG. 9 is an schematic diagram showing a second embodiment of the heat-radiating structure for the soldered portion between the terminal and the lead.

Referring to FIG. 9, there is shown a heat radiation structure for the soldered portion according to a second embodiment of the present invention. According to the present embodiment, a heat-radiating cylinder 44 formed of a material having good thermal conductivity such as aluminum is soldered adjacently to an end portion of the fluorescent tube 16. The other configurations of the present embodiment are the same as in the first embodiment shown in FIG. 6. Since the heat-radiating cylinder 44 has a larger heat radiation area as compared with the heat-radiating plate 40 in the first embodiment, the soldered portion between the terminal 34 and the lead 36 can be heat-radiated more efficiently. As a result, deterioration of the soldered portion due to a temperature rise can be restrained, and contact failure between the terminal 34 and the lead 36 can be prevented.

As has been described in detail above, according to the present invention the heat-radiating plate is provided adjacently to the soldered portion between the terminal of the fluorescent tube and the lead, so that the heat at the soldered portion is radiated by the heat-radiating plate, whereby deterioration of the soldered portion due to a temperature rise can be restrained. Preferably, the heat-radiating plate 40, 40' or the heat-radiating cylinder 44 is soldered simultaneously with the soldering between the terminal 34 and the lead 36. By this, the heat generated at the electrode 32 of the fluorescent tube 16 is transferred to the heat-radiating plate 40 or the heat-radiating cylinder 44 by heat conduction through the terminal 34 and the solder 42, and efficient heat radiation is achieved. Therefore, deterioration of the soldered portion due to a temperature rise can be restrained, and contact failure between the terminal 34 of the fluorescent tube 16 and the lead 36 can be prevented.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A backlight unit comprising:
    a light guide plate,
    a fluorescent tube having terminals at both ends thereof and disposed along a side surface of said light guide plate,
    a reflector plate mounted to a one surface of said light guide plate,
    a reflector film mounted to said light guide plate so as to cover said fluorescent tube,
    a pair of leads soldered respectively to said terminals, and
    a heat-radiating plate provided at at least one of soldered portions between said terminals and said leads.

2. A backlight unit as set forth in claim 1, wherein said heat-radiating plate is co-soldered to said soldered portion between said terminal and said lead.

3. A backlight unit as set forth in claim 2, wherein said heat-radiating plate is wavy in shape.

4. A backlight unit as set forth in claim 2, wherein said heat-radiating plate is cylindrical in shape.

5. A liquid crystal display device comprising:
    a liquid crystal panel,
    a light guide plate mounted to a one surface of said liquid crystal panel,
    a fluorescent tube having terminals at both ends thereof and disposed along a side surface of said light guide plate,
    a reflector plate mounted to a principal surface of said light guide plate on the side opposite to said liquid crystal panel,
    a reflector film mounted to said light guide plate so as to cover said fluorescent tube,
    a pair of leads soldered respectively to said terminals, and
    a heat-radiating plate provided at at least one of soldered portions between said terminals and said leads.

6. A liquid crystal display device as set forth in claim 5, wherein said heat-radiating plate is co-soldered to said soldered portion between said terminal and said lead.

* * * * *